US008142195B2

(12) United States Patent
Guo

(10) Patent No.: US 8,142,195 B2
(45) Date of Patent: Mar. 27, 2012

(54) CHINESE CHARACTER LEARNING SYSTEM

(76) Inventor: Xiaohui Guo, Weston, FL (US)

( * ) Notice: Subject to any disclaimer, the term of this patent is extended or adjusted under 35 U.S.C. 154(b) by 1032 days.

(21) Appl. No.: 12/015,464

(22) Filed: Jan. 16, 2008

(65) Prior Publication Data

US 2008/0170788 A1    Jul. 17, 2008

Related U.S. Application Data

(60) Provisional application No. 60/880,482, filed on Jan. 16, 2007.

(51) Int. Cl.
*G09B 5/00* (2006.01)
(52) U.S. Cl. .................. 434/169; 434/156; 434/350
(58) Field of Classification Search .............. 434/129, 434/169, 236, 350
See application file for complete search history.

(56) References Cited

U.S. PATENT DOCUMENTS

| | | | | |
|---|---|---|---|---|
| 3,271,884 | A * | 9/1966 | Roberson ...................... | 434/157 |
| 3,718,990 | A * | 3/1973 | Mercorelli et al. ........... | 434/167 |
| 4,262,431 | A * | 4/1981 | Darnell ......................... | 434/170 |
| 4,703,573 | A * | 11/1987 | Montgomery et al. ........ | 40/455 |
| 5,174,759 | A * | 12/1992 | Preston et al. ................ | 434/317 |
| 5,210,689 | A * | 5/1993 | Baker et al. .................. | 704/1 |
| 5,511,980 | A * | 4/1996 | Wood ........................... | 434/169 |
| 6,948,938 | B1 * | 9/2005 | Tseng ........................... | 434/129 |
| 7,257,366 | B2 * | 8/2007 | Maldonado et al. .......... | 434/317 |
| 7,689,407 | B2 * | 3/2010 | Yang et al. .................... | 704/3 |
| 2001/0041328 | A1 * | 11/2001 | Fisher .......................... | 434/157 |
| 2007/0238079 | A1 * | 10/2007 | Harrison ...................... | 434/236 |
| 2007/0269780 | A1 * | 11/2007 | Miller .......................... | 434/162 |
| 2008/0227062 | A1 * | 9/2008 | Yang ............................ | 434/157 |

* cited by examiner

*Primary Examiner* — Kang Hu
(74) *Attorney, Agent, or Firm* — Sean D. Burdick

(57) ABSTRACT

A system of materials facilitates teaching Chinese characters to a child in progressive stages, whether or not the teacher is fluent in Chinese. Each stage associates a multi-colored object with a correspondingly multi-colored Chinese character that represents the object. For a child from birth to two years, a first stage material animates the object and morphs the object into the corresponding Chinese character. For a child two to four years, a second stage material to be read to the child by the teacher displays the object adjacent to the character, and material provides interactive means for the child to associate the object with the character. For a child four to seven years, a third stage story book displays text containing a sentence made of multiple characters and a scene corresponding to the meaning of the sentence, and for a child seven to nine years, a fourth stage group book presents multiple Chinese characters that share a common group element, whether meaning or sound. The materials may include explanatory Chinese and non-Chinese text with Pin Yin and teaching tips for kinesthetic learning. The materials may each comprise separately executable programs in a common software module, for example, in DVD format.

19 Claims, 8 Drawing Sheets

CHINESE CHARACTER LEARNING SYSTEM

This application claims priority to U.S. Provisional Application 60/880,482 filed Jan. 16, 2007.

BACKGROUND OF THE INVENTION

1. Field of the Invention

The present invention relates generally to a language teaching aid. More particularly, it relates to a series of materials for teaching young children to read, pronounce, and write Chinese characters and to a method for using the materials in an order consistent with young children's cognitive developmental trajectory.

2. Description of Related Art

Learning Chinese characters may be difficult for some young children because the single-color printed word appearing on a page does not appear particularly attractive or interesting to them. If a child finds black letters written on a white page to be uninteresting, his or her Chinese skills will develop very slowly and perhaps not at all. For children trying to learn Chinese in an environment where Chinese is not the native language, it is even more difficult to master Chinese.

The way children enjoy and utilize stimuli such as colors, drawings, animations, musicals, and stories develops by stages. That is, when they are just born, at their Sensory Motor Period, infants are limited to viewing and listening to the stimuli. Starting at around age two, at their Preconceptual Period, children like to colorize objects, and draw lines and circles. Starting at around age four, at their Intuition Period, they may begin to logically connect objects such as Chinese characters with each other. Starting at around age seven, children can perform classification and can comprehend principles such as the principle that a pictophonetic character is built with two elements, one element indicating meaning and the other indicating sound.

In all language systems, there are about one hundred basic words that occupy 50% of daily usage. In Chinese, these basic words may each be written in the form of characters. In a native linguistic environment, children learn and use the basic words or characters repeatedly, which provides a solid foundation for them to develop their native language.

To summarize, what is needed, then, is a method and material for teaching Chinese to young children that attracts and holds their interest, suits their developmental stage, and imitates the natural linguistic environment, to enable young children to master and retain the basic Chinese characters, especially if they live outside the native Chinese environment.

SUMMARY OF THE INVENTION

The present invention allows a teacher who is a native Chinese speaker, as well as a teacher who is not fluent in Chinese, to teach the Chinese language to a child of any age. In one embodiment, the most frequently used Chinese characters, i.e. 100 or 200 basic characters, are presented repeatedly in progressive formats. These formats, each comprising a different stage material, collectively create a reinforcing environment for the child to learn Chinese characters even outside the natural Chinese language environment.

To facilitate learning Chinese characters, the invention presents Chinese characters as colorful characters through the use of methods and materials that allow Chinese characters to be viewed and traced by the learner. Each stroke of a Chinese character is assigned a color according to a part of an object drawing representing the meaning of the Chinese character or how the character evolved from its original pictographic form.

Materials according to the invention display Chinese characters in multi-colored format for viewing by the learner or, alternatively, in a white-colored format on colorful background for tracing by the learner. The invention exploits a child's attractiveness to bright colors, pretty drawings, animations, music, and stories, and presents these stimuli in progressive stages that track the child's natural cognitive developmental trajectory. That is, when they are just born, infant children are limited to viewing and listening to the stimuli. Starting at about age two, they like to colorize objects, and draw lines and circles. Starting at about age four, children begin to logically connect objects such as Chinese characters with each other. Starting at about age seven, children can perform classification and can comprehend principles such as the principle that a pictophonetic character is built with two elements, one element indicating meaning and the other element indicating sound.

A system according to the invention provides materials for teaching Chinese to a child in progressive stages, each stage building on the previous stage. In one embodiment the system may include a first stage material, such as a digital video program, that animates the object and morphs the object into a basic Chinese character representing the object. In particular, the invention may provide as a first stage material, a video program for teaching Chinese to a child. The video program may be a DVD storing a plurality of story-telling animations, each animation displaying a basic Chinese character having one or more colored strokes, each animation starting with an attractive multi-colored drawing object indicating both a meaning and appearance of the Chinese character being displayed, each animation gradually converting the multi-colored drawing object into the Chinese character being displayed, such that color of each stroke of the Chinese character being displayed corresponds to a part of the multi-colored drawing object. The video program may include an audio track for accompanying each animation with an audible melody, for playing an audible voice pronouncing the Chinese character in Chinese, and for playing an audible translation of the Chinese character in a preselected non-Chinese language.

A second stage material, such as a text book designed to be read to the child by the teacher, may display on a single page the object adjacent to the character, and may include a first block of text written in Chinese including an explanation of the basic Chinese character, and a second block of text including a Pin Yin for pronouncing the basic Chinese character. Another second stage material may display on a single page the object adjacent to the character and provide interactive means for the child to associate the object with the character. The interactive means may be a coloring book or a circling and lining book.

The system may include a third stage material combining multiple Chinese characters in a story book, the story book displaying text containing a sentence made of basic characters and new characters and scenes representing the meaning of the sentence. The story book allows the child to encounter the basic characters in single-colored format and associate characters with each other.

The system may include a fourth stage material combining multiple Chinese characters into a group book. Each page of the group book may display a group element heading that represents a particular sound or meaning, a plurality of rows below the heading, each row displaying the group element, a basic Chinese character adjacent to the group element, and a new character representing a combination of the group element and the adjacent basic Chinese character. In any of the materials, the invention may provide a first block of Chinese text that includes an explanation of the basic Chinese character and corresponding teaching tips for teaching the basic Chinese character kinesthetically, and a second block of text that includes in a non-Chinese language text explaining the basic Chinese character and corresponding teaching tips. The group book helps the child to classify and analyze characters.

In another embodiment, the first, second, third, and fourth stage materials may each comprise separately executable programs in a common software module.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION OF THE INVENTION

The present invention provides a novel and highly effective system and method for teaching young children to read, write, and speak Chinese. The invention is based on the theory that when teaching young children Chinese characters, it is not only necessary to present simple materials at a younger age and complicated materials at an older age, but also to use a method to deliver these materials in a way that suits each of the child's developmental stages. According to the invention, the Chinese characters presented to the child include bright colors and attractive pictures and animations. Moreover, the colors, pictures, and animations have a logical connection to, and reflect the pictographic nature of the Chinese characters being taught. Likewise, the colors, pictures, and animations bring characters to life to give each character meaning and feelings that can involve young learners in physical activity related to the character being taught so that the learning process is not exclusively mental.

Overview on Using the Materials of the Present Invention

In one embodiment of the invention, Chinese characters are presented to young learners, i.e. infants or older, by using an animation program. Preferably, the animation program presents multi-colored images that are attractive to young minds. The animation program may be stored on a computer readable media such as a DVD, and played for the child learner on a television, computer monitor, or other video display.

Figure 1:
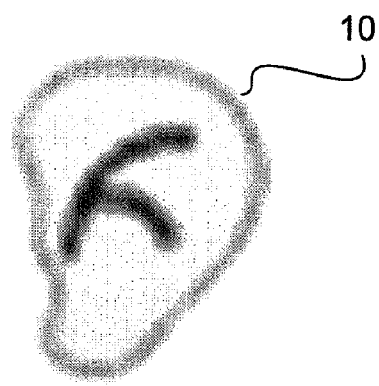
FIG. 1 is a static view, shown in grayscale, of a multi-colored first scene of one embodiment of an animation program according to the invention.
Figure 2:
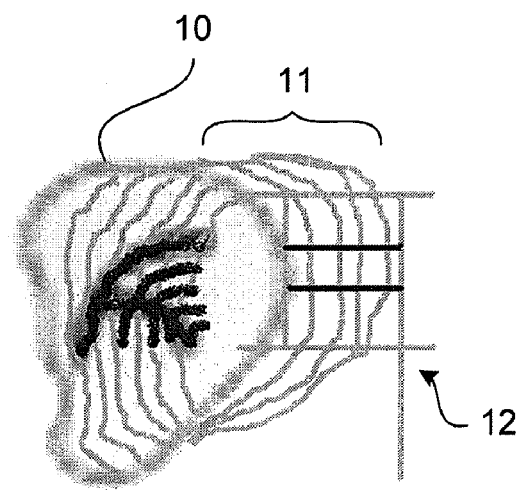
FIG. 2 is a static view, shown in grayscale, of a multi-colored intermediate scene of the same animation program.
Figure 3:
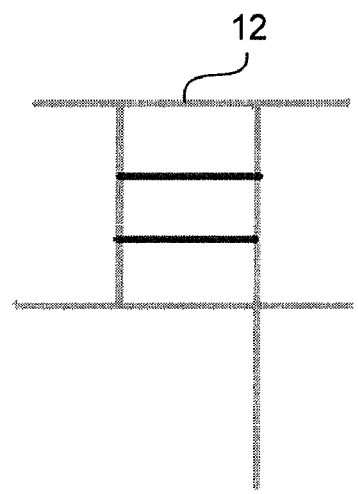
FIG. 3 is a static view, shown in grayscale, of a multi-colored final scene of the same animation program.

The animation program may be described as having three frames or scenes. A first scene presents an action or object, preferably a common object 10 such as the human ear shown in the static view of FIG. 1. A second scene (or series of intermediate scenes) shows a transition or "morphing" of the object 10 into a Chinese character 12 that represents the object. The wavelike images 11 shown in the static view of FIG. 2 represent one or more intermediate frames of animation that gradually transition the image of the object 10 into the image of the character 12. A third scene, shown in FIG. 3, depicts the final static view of the Chinese character 12. A sound or syllable associated with the Chinese character may also be played from the DVD as an audible sound bite coincident with the animation to aid the student with pronunciation.

In one embodiment, the animation program contains multiple animation scenes, one for each Chinese character in the curriculum. An exemplary curriculum contains the approximate one hundred basic characters. Other curricula are possible within the scope of the invention, for example, a particular curriculum may focus on special subject matter such as only body parts, only household items, only food, only animals, only actions, etc.

The animation program is particularly well suited for very young children in the infant and toddler years. As the child grows into more advanced stages of learning, a system according to the invention may present the same curricula in other forms, using other materials. These materials, singly or in combination, make up different embodiments of the invention. The materials may include one or more of (i) the animation program, (ii) a text book, (iii) a coloring book, (iv) a circling and lining book, and (v) a story book, each showing animated or static versions of Chinese characters (e.g. the character 12) and their corresponding pictures (e.g. the ear 10) to allow the child to learn passively or interactively by associating the Chinese characters with the corresponding morpheme and syllable that it represents.

The following paragraphs illustrate exemplary methods of stage-by-stage teaching using the materials of the invention.

A. For learners who start using the system of the present invention at an age between birth and two years, the teacher is preferably a native or fluent Chinese speaker and writer.

Stage I (0 to 2 years old): Using a player that can play a DVD disk, such as a DVD player or a computer, the teacher presents the animation program to the learner periodically, for example, once a day for fifteen minutes each time.

Figure 4:
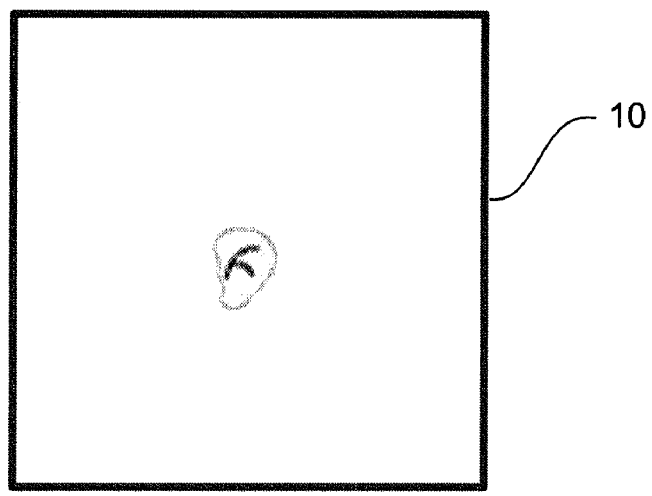
FIG. 4 is a pictorial view of one page of an instructional text book according to one embodiment of the invention.
Figure 4:
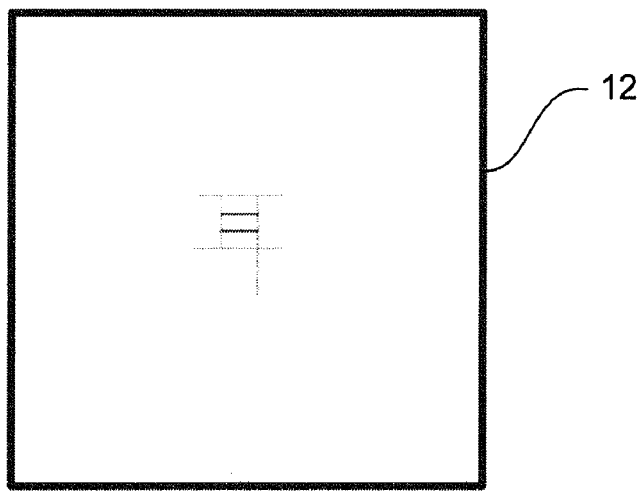
Figure 4:
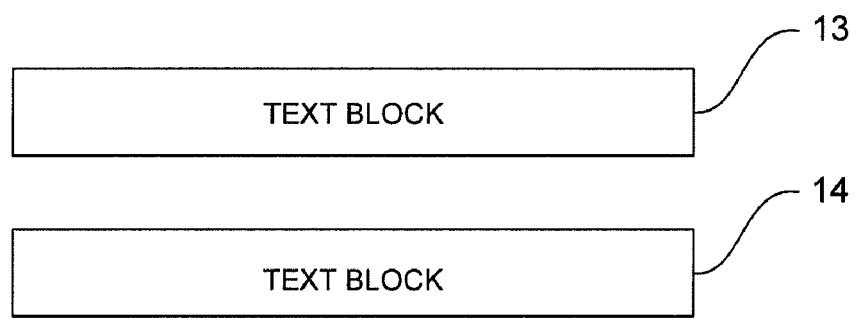

Stage II (2 to 4 years old): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

Figure 10:
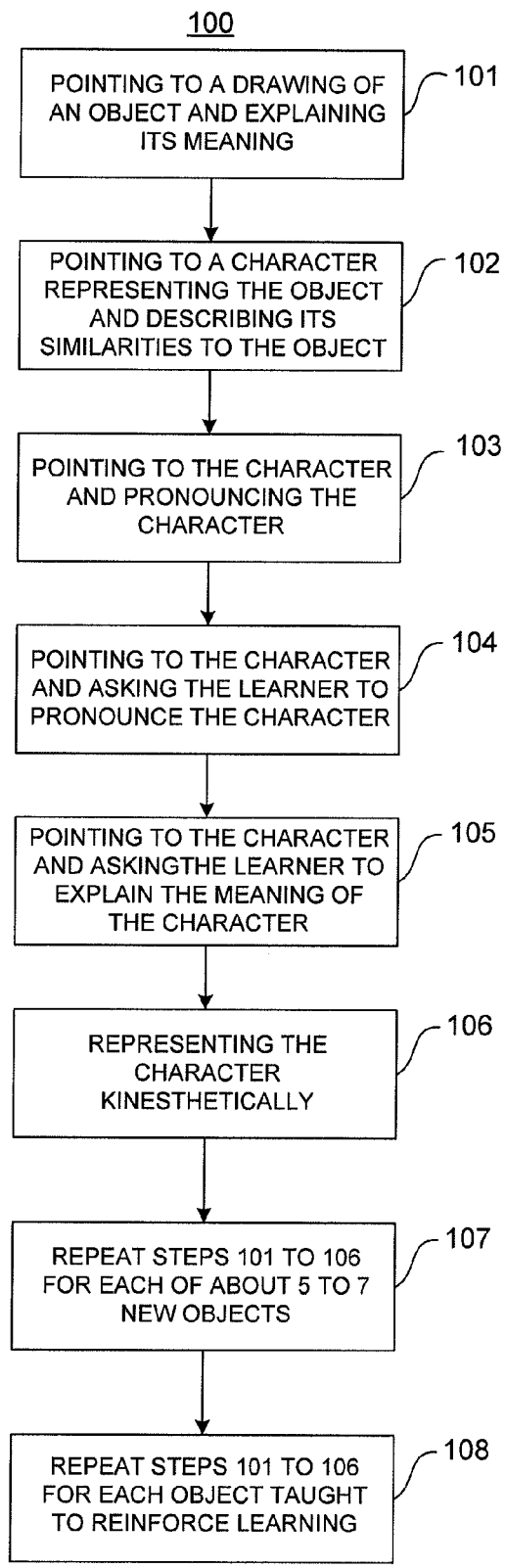
FIG. 10 shows a flowchart of one method according to the invention for teaching a child the Chinese language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character 12 and pronounces the character, as guided by the Pin Yin (i.e., phonetic Chinese) in text block 14. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing or interpreting the character, the teacher may repeat selected steps in the above sequence, such as pronouncing or interpreting the word again until the learner can pronounce and interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

Figure 5:
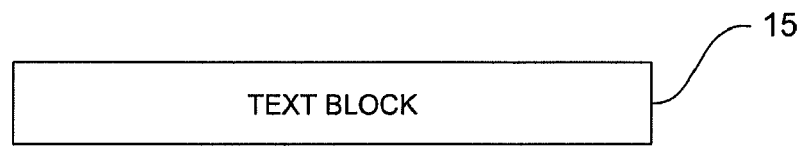
FIG. 5 is a pictorial view of one page of an instructional coloring book according to another embodiment of the invention.
Figure 5:
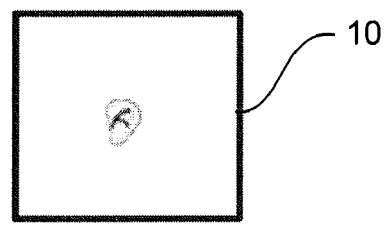
Figure 5:
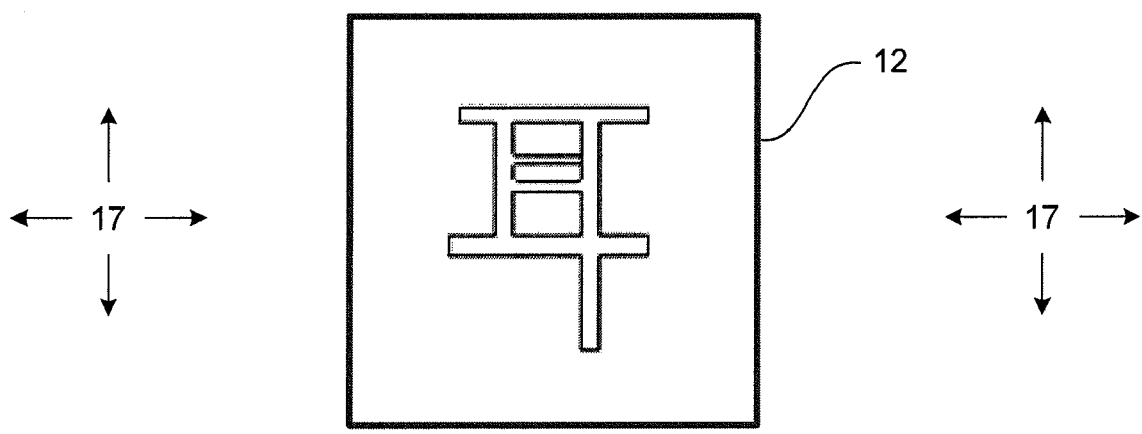
Figure 5:
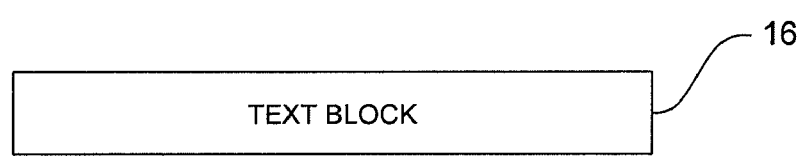

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page. The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The circling and lining book presents each of the basic Chinese characters with a drawing showing both the meaning and the look of the character, along with the matching Chinese character.

Figure 6:
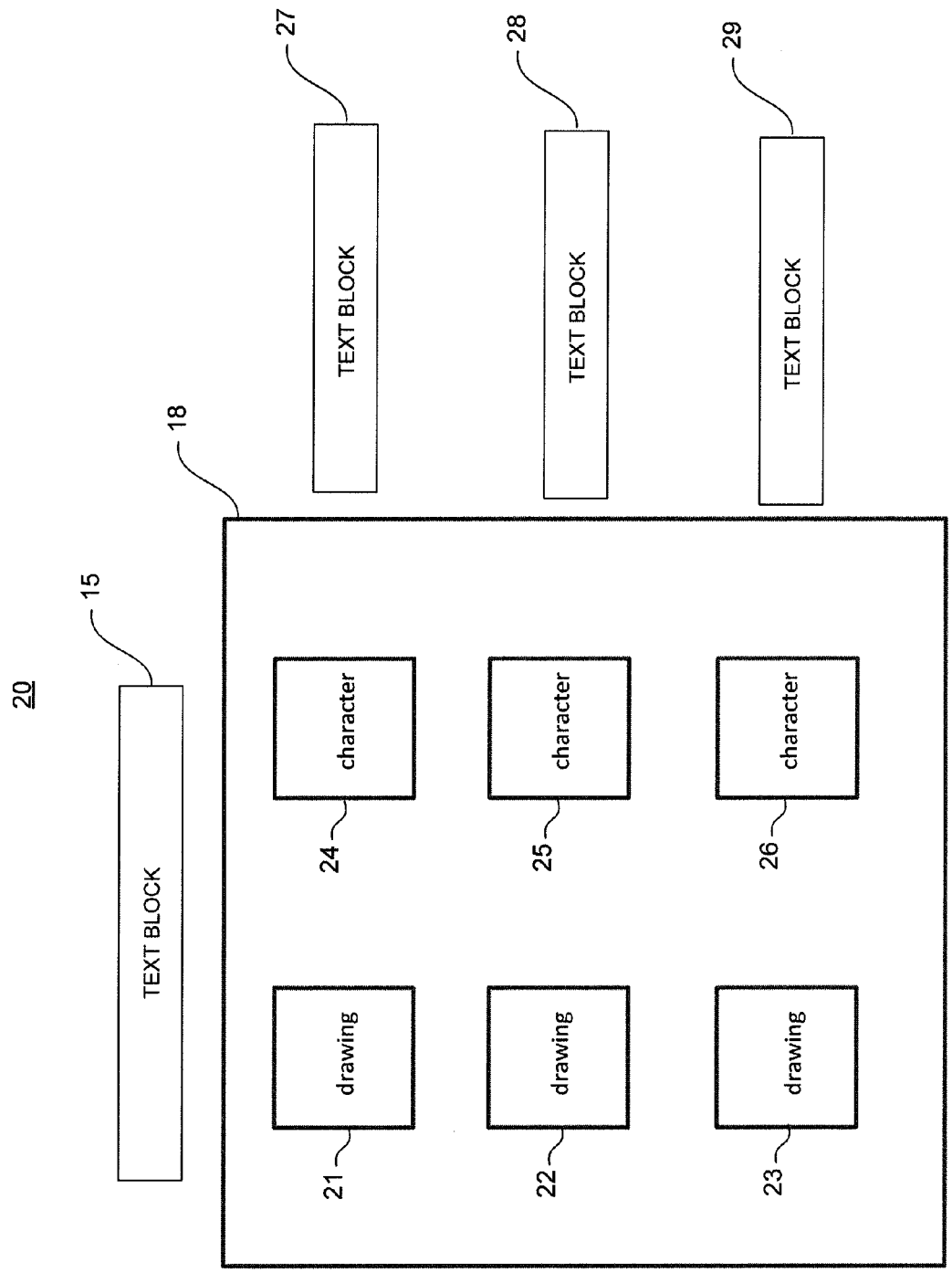
FIG. 6 shows a layout of one page of an instructional circling and lining book according to another embodiment of the invention.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

Figure 7:
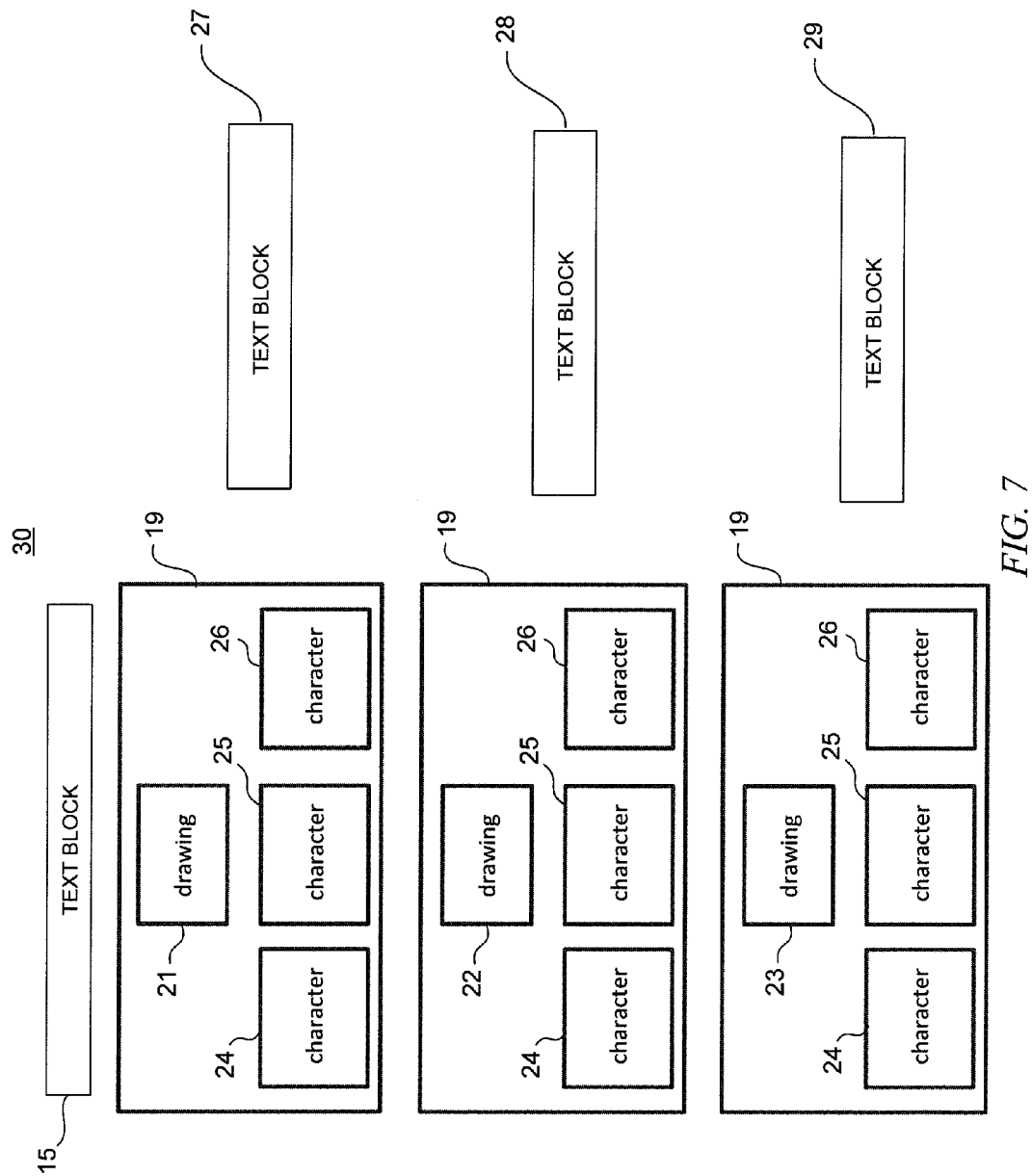
FIG. 7 shows a layout of another page of the instructional circling and lining book of, FIG. 6.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

Figure 8:
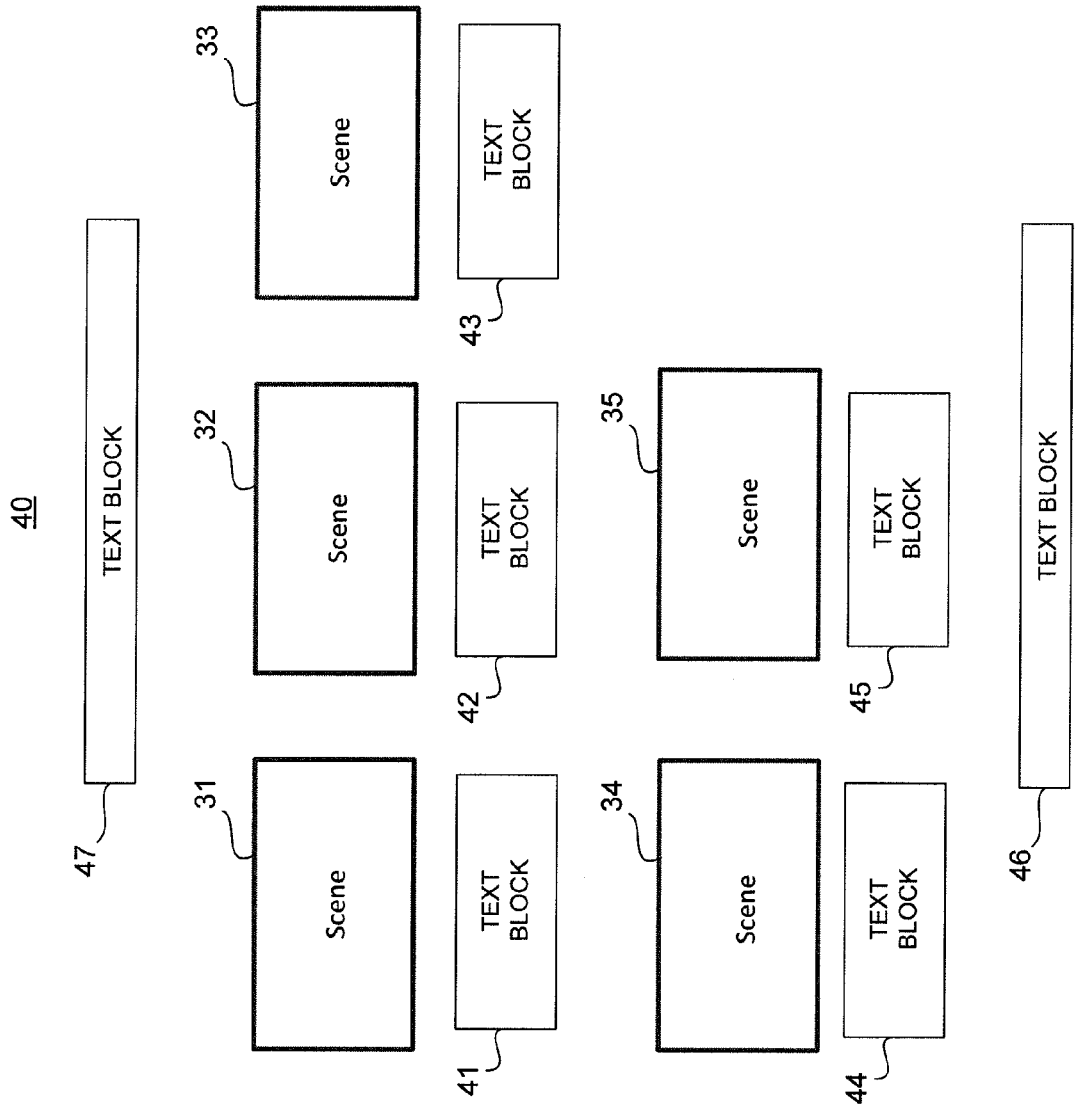
FIG. 8 shows a layout of one page of a story book according to another embodiment of the invention.

Stage III (4 to 7 years-old): After the learner has mastered all words from the text book, the teacher may introduce the story book to the learner. An exemplary page 40 from a story book according to the invention is shown in FIG. 8. The story book may display text containing a sentence made of basic Chinese characters and new characters and scenes representing the meaning of the sentence. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book. The teacher may help the learner to recognize the learned characters by saying "this character looks like . . . " and may answer the learner's question on unknown ones. After reading together for a couple of times, the teacher may encourage the learner to read the story by himself or herself. Whenever possible, the teacher and the learner should continue reviewing the text book.

Figure 9:
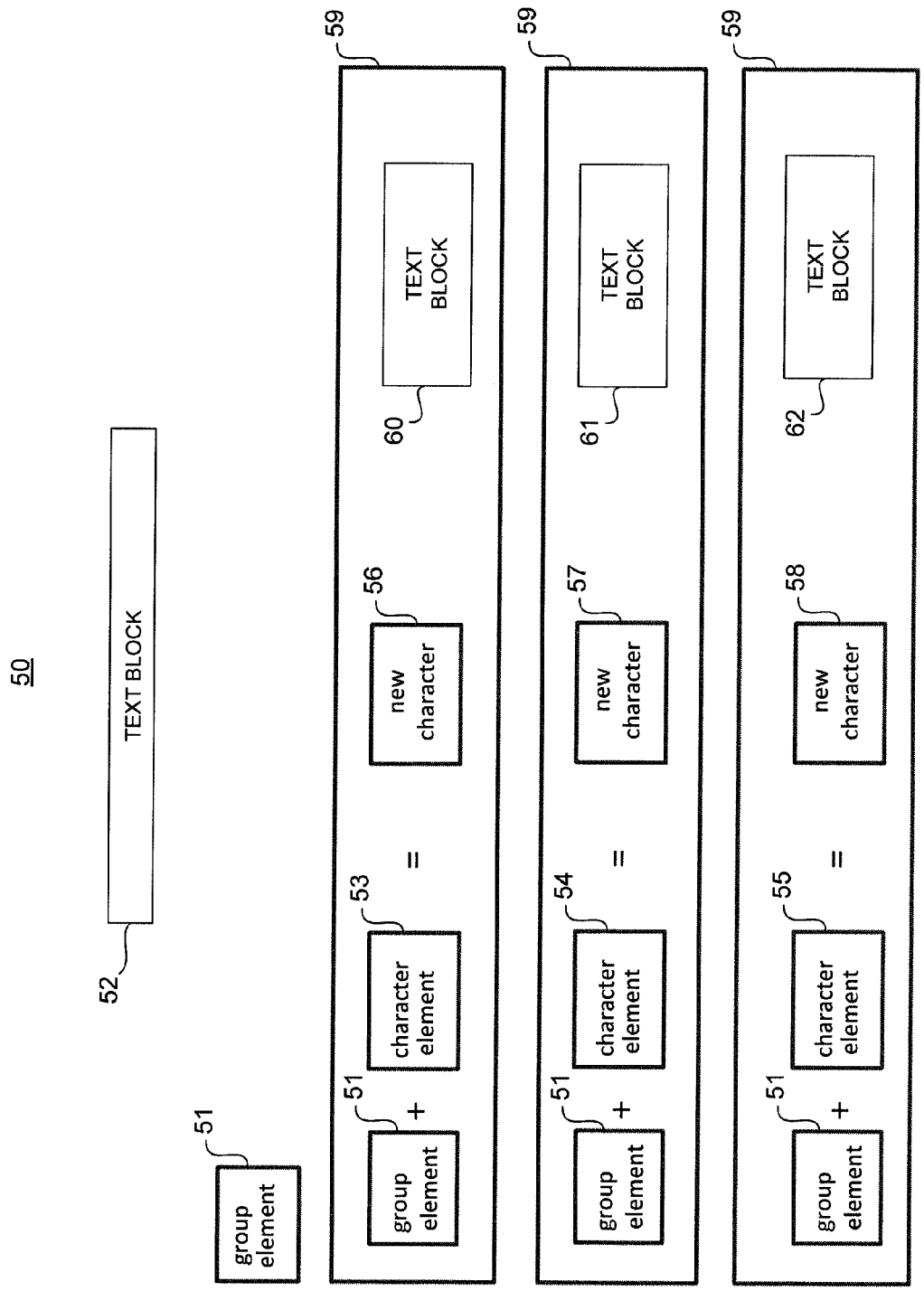
FIG. 9 shows a layout of one page of a group book according to another embodiment of the invention.

Stage IV (7 to 9 years-old): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

B. For learners who start using this system of the present invention at the age of 0 to 2 years old and the teacher is not a native or fluent Chinese speaker and writer, the following methods may be used:

Stage I (0 to 2 years old): Using a player that can play a DVD disk, such as a DVD player or a computer, the teacher presents the animation program to the learner periodically, for example, once a day for fifteen minutes each time.

Stage II (2 to 4 years old): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character and waits for the audio program to pronounces the character for one or more times. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing it, the teacher should rewind the audio program to reveal the pronunciation again until the learner can pronounce it correctly. If the learner has trouble interpreting the character, the teacher should interpret it again until the learner can interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page. The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color. The audio program accompanying the coloring book can be used to help the learner practice the pronunciation of each character in the book.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The audio program accompanying the coloring book can be used to help the learner practice the pronunciation of each character in the book.

The circling and lining book presents each of the basic Chinese characters with a drawing showing both the meaning and the look of the character, along with the matching Chinese character.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

Stage III (4 to 7 years-old): After the learner has mastered all words from the text book, the teacher may introduce the story book to the learner. An exemplary page 40 from a story book according to the invention is shown in FIG. 8. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book.

To use the audio device as a teaching aid, the teacher may turn on the audio program, help the learner find the right page, and ask the learner to read the book together with the audio program. The audio program helps the learner recognize the learned characters, for example, by speaking phrases such as: "The first character looks like . . . ", "That is right, the first character is . . . " and helps the learner to learn the new characters by speaking phrases such as: "The second character is a new word, it is pronounced as . . . and means . . . " The teacher should help the learner find each character mentioned in the audio program as the audio program is being played.

After reading together for a couple of times, the teacher may encourage the learner to read the story by himself or herself. Whenever possible, the teacher and the learner should continue reviewing the text book.

Stage IV (7 to 9 years-old): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book. When using the audio device as a teaching aid, the teacher turns on the audio program, helps the learner find the right page, and asks the learner to study the book together with the audio program. For each group, the audio program first explains the group element and the character element. Then the audio program encourages the learner to guess the meaning or the sound of each new character. After finishing all characters in one group, the audio program and the learner review the whole group one or more times before moving to the next group.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

C. For learners who start using the system of the present invention at an age between birth and two years, the teacher is preferably a native or fluent Chinese speaker and writer.

Stage I (2 to 4 years old): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character 12 and pronounces the character, as guided by the Pin Yin (i.e., phonetic Chinese) in text block 14. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing or interpreting the character, the teacher may repeat selected steps in the above sequence, such as pronouncing or interpreting the word again until the learner can pronounce and interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page.

The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The circling and lining book presents each of the basic Chinese characters with a drawing showing both the meaning and the look of the character, along with the matching Chinese character.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

Once a month, using a player that can play a DVD disk, such as a DVD player or a computer, the teacher may present the animation program to the learner, as a reward.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

Stage II (4 to 7 years-old): After the learner has mastered all words from the text book, the teacher may introduce the story book to the learner. An exemplary page 40 from a story book according to the invention is shown in FIG. 8. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book. The teacher may help the learner to recognize the learned characters by saying "this character looks like . . . " and may answer the learner's question on unknown ones. After reading together for a couple of times, the teacher may encourage the learner to read the story by himself or herself. Whenever possible, the teacher and the learner should continue reviewing the text book.

Stage III (7 to 9 years-old): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

D. For learners who start using this system of the present invention at the age of 2 to 4 years old and the teacher is not a native or fluent Chinese speaker and writer, the following methods may be used:

Stage I (2 to 4 years old): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character and waits for the audio program to pronounces the character for one or more times. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing it, the teacher should rewind the audio program to reveal the pronunciation again until the learner can pronounce it correctly. If the learner has trouble interpreting the character, the teacher should interpret it again until the learner can interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page. The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color. The audio program accompanying the coloring book can be used to help the learner practice the pronunciation of each character in the book.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The audio program accompanying the coloring book can be used to help the learner practice the pronunciation of each character in the book.

The circling and lining book presents each of the basic Chinese characters with a drawing showing both the meaning and the look of the character, along with the matching Chinese character.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

Once a month, using a player that can play a DVD disk, such as a DVD player or a computer, the teacher may present the animation program to the learner, as a reward.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

Stage II (4 to 7 years-old): After the learner has mastered all words from the text book, the teacher may introduce the story book to the learner. An exemplary page 40 from a story book according to the invention is shown in FIG. 8. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book.

To use the audio device as a teaching aid, the teacher may turn on the audio program, help the learner find the right page, and ask the learner to read the book together with the audio program. The audio program helps the learner recognize the learned characters, for example, by speaking phrases such as: "The first character looks like . . . ", "That is right, the first character is . . . " and helps the learner to learn the new characters by speaking phrases such as: "The second character is a new word, it is pronounced as . . . and means . . . " The teacher should help the learner find each character mentioned in the audio program as the audio program is being played.

After reading together for a couple of times, the teacher may encourage the learner to read the story by himself or herself. Whenever possible, the teacher and the learner should continue reviewing the text book.

Once a month, using a player that can play a DVD disk, such as a DVD player or a computer, the teacher may present the animation program to the learner, as a reward.

Stage III (7 to 9 years-old): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book. When using the audio device as a teaching aid, the teacher turns on the audio program, helps the learner find the right page, and asks the learner to study the book together with the audio program. For each group, the audio program first explains the group element and the character element. Then the audio program encourages the learner to guess the meaning or the sound of each new character. After finishing all characters in one group, the audio program and the learner review the whole group one or more times before moving to the next group.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

Once a month, using a player that can play a DVD disk, such as a DVD player or a computer, the teacher may present the animation program to the learner, as a reward.

E. For learners who start using the system of the present invention at an age between four and seven years, the teacher is preferably a native or fluent Chinese speaker and writer.

Stage I (four to seven years old before mastering all the words from the text book): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character 12 and pronounces the character, as guided by the Pin Yin (i.e., phonetic Chinese) in text block 14. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing or interpreting the character, the teacher may repeat selected steps in the above sequence, such as pronouncing or interpreting the word again until the learner can pronounce and interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page. The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The circling and lining book presents each of the basic Chinese characters with a drawing showing both the meaning and the look of the character, along with the matching Chinese character.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

Once a month, using a player that can play a DVD disk, such as a DVD player or a computer, the teacher may present the animation program to the learner, as a reward.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

Stage II (4 to 7 years-old after mastering all the words from the text book): After the learner has mastered all words from the text book, the teacher may introduce the story book to the learner. An exemplary page 40 from a story book according to the invention is shown in FIG. 8. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book. The teacher may help the learner to recognize the learned characters by saying "this character looks like . . . " and may answer the learner's question on unknown ones. After reading together for a couple of times, the teacher may encourage the learner to read the story by himself or herself. Whenever possible, the teacher and the learner should continue reviewing the text book.

Stage III (7 to 9 years-old): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

F. For learners who start using this system of the present invention at the age of four to seven years old and the teacher is not a native or fluent Chinese speaker and writer, the following methods may be used:

Stage I (4 to 7 years old before mastering all the words from the text book): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character and waits for the audio program to pronounces the character for one or more times. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing it, the teacher should rewind the audio program to reveal the pronunciation again until the learner can pronounce it correctly. If the learner has trouble interpreting the character, the teacher should interpret it again until the learner can interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page. The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color. The audio program accompanying the coloring book can be used to help the learner practice the pronunciation of each character in the book.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The audio program accompanying the coloring book can be used to help the learner practice the pronunciation of each character in the book.

The circling and lining book presents each of the basic Chinese characters with a drawing showing both the meaning and the look of the character, along with the matching Chinese character.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

Once a month, using a player that can play a DVD disk, such as a DVD player or a computer, the teacher may present the animation program to the learner, as a reward.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

Stage II (4 to 7 years-old after mastering all the words from the text book): After the learner has mastered all words from the text book, the teacher may introduce the story book to the learner. An exemplary page 40 from a story book according to the invention is shown in FIG. 8. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book.

To use the audio device as a teaching aid, the teacher may turn on the audio program, help the learner find the right page, and ask the learner to read the book together with the audio program. The audio program helps the learner recognize the learned characters, for example, by speaking phrases such as: "The first character looks like . . . ", "That is right, the first character is . . . " and helps the learner to learn the new characters by speaking phrases such as: "The second character is a new word, it is pronounced as . . . and means . . . " The teacher should help the learner find each character mentioned in the audio program as the audio program is being played.

After reading together for a couple of times, the teacher may encourage the learner to read the story by himself or herself. Whenever possible, the teacher and the learner should continue reviewing the text book.

Once a month, using a player that can play a DVD disk, such as a DVD player or a computer, the teacher may present the animation program to the learner, as a reward.

Stage III (7 to 9 years-old): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book. When using the audio device as a teaching aid, the teacher turns on the audio program, helps the learner find the right page, and asks the learner to study the book together with the audio program. For each group, the audio program first explains the group element and the character element. Then the audio program encourages the learner to guess the meaning or the sound of each new character. After finishing all characters in one group, the audio program and the learner review the whole group one or more times before moving to the next group.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

Once a month, using a player that can play a DVD disk, such as a DVD player or a computer, the teacher may present the animation program to the learner, as a reward.

G. For learners who start using the system of the present invention at an age between seven and nine years, the teacher is preferably a native or fluent Chinese speaker and writer.

Stage I (seven to nine years old before mastering all the words from the text book): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character 12 and pronounces the character, as guided by the Pin Yin (i.e., phonetic Chinese) in text block 14. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing or interpreting the character, the teacher may repeat selected steps in the above sequence, such as pronouncing or interpreting the word again until the learner can pronounce and interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page. The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The circling and lining book presents each of the basic Chinese characters with a drawing showing both the meaning and the look of the character, along with the matching Chinese character.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

Once a month, using a player that can play a DVD disk, such as a DVD player or a computer, the teacher may present the animation program to the learner, as a reward.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

After a few weeks of working together, the teacher should encourage the learner to study with the audio program all by himself or herself.

Stage II (seven to nine years-old after mastering all the words from the text book): After the learner has mastered all words from the text book, the teacher may introduce the story book to the learner. An exemplary page 40 from a story book according to the invention is shown in FIG. 8. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book. The teacher may help the learner to recognize the learned characters by saying "this character looks like . . . " and may answer the learner's question on unknown ones. After reading together for a couple of times, the teacher may encourage the learner to read the story by himself or herself. Whenever possible, the teacher and the learner should continue reviewing the text book.

After a few weeks of working together, the teacher should encourage the learner to study with the audio program all by himself or herself.

Stage III (7 to 9 years-old after finishing the story book): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

After a few weeks of working together, the teacher should encourage the learner to study with the audio program all by himself or herself.

H. For learners who start using this system of the present invention at the age of four to seven years old and the teacher is not a native or fluent Chinese speaker and writer, the following methods may be used:

Stage I (seven to nine years old before mastering all the words from the text book): This stage is described with reference to the text book page depicted in FIG. 4, which shows one inside page of the textbook. This page shows the object 10 along with the corresponding Chinese character 12. At the bottom of the page, there is provided a first block of text 13 written in Chinese, and a second block of text 14 written in the teacher's native language. Text block 13 may include the character 10 in smaller font, along with an explanation of the character in Chinese. Text block 13 may also include tips for teaching character 12 kinesthetically in Chinese. Text block 14 may include a Pin Yin (i.e. phonetic Chinese) for pronouncing the character 12, along with an explanation of the character in the teacher's native language. Text block 14 may also include teaching tips written in the teacher's native language.

The teacher and the learner may read the text book together in the following steps of method 100, which are shown in the flowchart of FIG. 10: First, in step 101, the teacher opens the book, points to the drawing of object 10, and explains the meaning of the drawing to the learner, as guided by the explanation in text block 13. Second, in step 102, the teacher points to the Chinese character 12 and describes the similarity between each part of the object 10 and each stroke of the character 12, as guided by the explanation in text block 13. Third, in step 103, the teacher points to the character and waits for the audio program to pronounces the character for one or more times. Fourth, in step 104, the teacher points to the character 12 and asks the learner to pronounce the character. Fifth, in step 105, the teacher points to the character 12 and asks the learner to explain the meaning of the character. Sixth, in step 106, according to the tips in text block 13 or 14, the teacher and the learner may play or represent the character kinesthetically. An example of a teaching tip for this step may be "Ask the student to touch or rub each part of the auricle while pointing to each stroke of the character."

Seventh, in step 107, the teacher and the learner repeat steps 101 through 106 for a new word or object, i.e. a new Chinese character. In one embodiment, the text book will contain one object 10 and its associated character 12 per page. Eighth, in step 108, after teaching some number of words, such as five to seven words, the teacher may turn pages back to the first word and ask the learner to pronounce and interpret the first word. If the learner can pronounce and interpret the character correctly, the teacher may go to the next word that has been taught in that session. If the learner has trouble pronouncing it, the teacher should rewind the audio program to reveal the pronunciation again until the learner can pronounce it correctly. If the learner has trouble interpreting the character, the teacher should interpret it again until the learner can interpret it correctly. On the next day, the teacher and the learner may first review the words exposed in a previous day in a way described in step 108. After reviewing, the teacher and the learner can start another set of about five to seven words. The teacher should always help the learner to review previously learned words while learning new words.

It is crucial to keep one day's load no more than seven new words plus reviewing some of the previous exposed words due to a young child's limited attention span. If someday the learner has trouble focusing, the teacher should encourage the child to review the previous exposed words only without learning any new words.

If the learner requests to look at other words that show up on later pages, the teacher may allow the child to do so but only after the child has finished that day's study load from the text book, such as five to seven new words or reviewing previous exposed words.

After two weeks of learning from the text book, the learner may start showing signs of losing interest on the text book. At this point, the teacher should introduce the learner to play games on the coloring book, as a reward to continue reading from the text book. The coloring book, shown in FIG. 5, presents each of the basic Chinese characters with a smaller-sized colored drawing of the object 10 showing both the meaning and the look of the character on the top of the page. The meaning may be captured in text blocks 15 and/or 16. In one embodiment, text block 15 may be located at the top of the page and may include an instruction in the teacher's or learner's native language, and text block 16 may be located toward the bottom of the page and may contain the pronunciation and meaning of the character in the form of Pin Yin along with an explanation in the teacher's or learner's native language. In the middle of the page, the character 12 may be presented in a size much larger (e.g. double) than that of the drawing of the object 10. All strokes of the printed character may be presented in white against a colorful background 17, which allows the child to color each stroke to match that of the drawing. An audio tape presenting the pronunciation and meaning of all characters and the instructions of using the book in the user's native language may be provided along with the coloring book. Each day after finishing that day's study load from the text book, the teacher may open the coloring book, point to the character, guide the learner to find each stroke of the character that matches each part of the drawing, and ask the learner to fill in the stroke with the right color. The audio program accompanying the coloring book can be used to help the learner practice the pronunciation of each character in the book.

After two weeks of playing on the coloring book, or when the learner starts showing signs of losing interest in both the text book and the coloring book, the teacher may introduce another material of the invention, a game known as circling and lining. Circling and lining may be introduced as a reward to continue reading from the text book. The audio program accompanying the coloring book can be used to help the learner practice the pronunciation of each character in the book.

The circling and lining book presents each of the basic Chinese characters with a drawing showing both the meaning and the look of the character, along with the matching Chinese character.

An example of an odd numbered page 20 of a circling and lining book is shown in FIG. 6. On the odd pages, within a rectangle frame 18, three object drawings 21, 22 and 23 are presented on the left side with three matching Chinese characters 24, 25 and 26 on the right side, usually not in the same order. The learner is instructed to use a line to connect each drawing with a matching character. The pronunciation and the meaning of each character 24, 25 and 26 are presented in text blocks 27, 28 and 29, respectively, on the right side outside the frame 18 to assist the teacher and learner. Each text block 27, 28 and 29 may contain Pin Yin and an explanation in the teacher's or learner's native language for each corresponding character. Text block 15 may be located at the top of the page and may include an instruction in the teacher's or learner's native language.

An example of an even numbered page 30 of a circling and lining book is shown in FIG. 7. On the even pages, within individual frames 19, each of the three object drawings 21, 22 and 23 is presented along with the three characters 24, 25 and 26 below it, as shown. Each even page may also include text blocks 27, 28 and 29 on the right side outside of the frames 19, each having Pin Yin and explanations to assist the teacher and learner. Text block 15 may be located at the top of the page and may include an instruction in the teacher's or learner's native language.

Each day after finishing that day's study load from the text book, the teacher may open the circling and lining book, point to each of the drawings, guide the learner to find the character that looks like the drawing, and ask the learner either to circle the character that matches the drawing (on even pages) or draw a line between the character and the drawing (on odd pages).

After introducing both game books, the teacher can use them interchangeably as a reward for the learner to finish that day's study load from the text book. When the learner gets familiar with the game book, the teacher can allow the learner to engage the game by himself or herself. All pages of both games may be reproducible so that the games can be played multiple times. When the learner finishes the whole text book, the teacher and the learner should continue reviewing five to seven words a day from the text book and playing with the two game books to reinforce the learning.

Once a month, using a player that can play a DVD disk, such as a DVD player or a computer, the teacher may present the animation program to the learner, as a reward.

To prepare for the next phase, the teacher may present the story part of an audio program that accompanies the story book. For example, the teacher may present one story per day by playing the audio device (e.g., a CD, tape, or digital recording) in an appropriate player, to the learner, to familiarize the learner with stories that will be studied in the next phase.

After a few weeks of working together, the teacher should encourage the learner to study with the audio program all by himself or herself.

Stage II (seven to nine years-old after mastering all the words from the text book): After the learner has mastered all words from the text book, the teacher may introduce the story book to the learner. An exemplary page 40 from a story book according to the invention is shown in FIG. 8. The story book may contain multiple stories, such as 50 stories, consisting mostly of the basic characters, plus 100 new characters. Each story may be made of about 4 to 10 sentences, accompanied by several scenes in sequence. For example, on page 40, there are five illustrated scenes 31, 32, 33, 34 and 35. Below each scene there is a text block 41, 42, 43, 44 and 45, each corresponding, respectively, to the scene above it. Each text block 41, 42, 43, 44 and 45 may contain a sentence that uses many of the characters learned in a previous stage to describe the scene directly above it. Each sentence may also include new characters, accompanied by their own Pin Yin. Explanations of the new characters may be presented in another text block 46 at the bottom of the page. Another text block 47 may be presented at the top of the page for displaying a title of the page in both Chinese and in the teacher's or learner's native language. An audio device (e.g., a CD, tape, or digital recording) recorded in the teacher's or learner's native language may be provided with the story book.

To use the audio device as a teaching aid, the teacher may turn on the audio program, help the learner find the right page, and ask the learner to read the book together with the audio program. The audio program helps the learner recognize the learned characters, for example, by speaking phrases such as: "The first character looks like . . . ", "That is right, the first character is . . . " and helps the learner to learn the new characters by speaking phrases such as: "The second character is a new word, it is pronounced as . . . and means . . . " The teacher should help the learner find each character mentioned in the audio program as the audio program is being played.

After reading together for a couple of times, the teacher may encourage the learner to read the story by himself or herself. Whenever possible, the teacher and the learner should continue reviewing the text book.

Once a month, using a player that can play a DVD disk, such as a DVD player or a computer, the teacher may present the animation program to the learner, as a reward.

After a few weeks of working together, the teacher should encourage the learner to study with the audio program all by himself or herself.

Stage III (seven to nine years-old after finishing the story book): In this stage, the teacher introduces the group book to the learner. One exemplary page 50 of the group book is shown in FIG. 9. The group book may present hundreds of new characters to the learner, and in one embodiment, may present about 700 new characters. Each of these characters is preferably based on or relevant to one or several of the 300 or so characters previously learned. In one embodiment of the group book, characters having the same "meaning" or "sounding" element are presented in groups, along with each one's own pronunciation and interpretation in the learner's native language. An audio device (e.g., a CD, tape, or digital recording) in the learner's native language may be provided with the book. When using the audio device as a teaching aid, the teacher turns on the audio program, helps the learner find the right page, and asks the learner to study the book together with the audio program. For each group, the audio program first explains the group element and the character element. Then the audio program encourages the learner to guess the meaning or the sound of each new character. After finishing all characters in one group, the audio program and the learner review the whole group one or more times before moving to the next group.

As shown on page 50, a group element 51 may be illustrated at the top of the page, and a text block 52 may be provided next to the group element that contains an instruction in Chinese and in the teacher's native language, and also an explanation of the group element 51 in the teacher's native language. The body of page 50 may include a plurality of rows or frames 59, and each frame 59 may contain the group element 51, a previously learned character element (53, 54 or 55) to be combined with the group element, and a new character (56, 57 or 58) resulting from the combination. Text blocks 60, 61 and 62 may be added within each frame 59 to provide an explanation of each new character in Chinese, and also the corresponding Pin Yin and explanation in the teacher's or learner's native language.

For each group, the teacher first explains the group element, and then explains the character elements 53, 54 and 55, each of which may be separately combined with the group element 51. Then the teacher may encourage the learner to guess the meaning or the sound of each of the new characters 56, 57 and 58 formed by combination with the group element. After finishing all characters in one group, the teacher and the learner preferably review the whole group before moving to the next group.

Once a month, using a player that can play a DVD disk, such as a DVD player or a computer, the teacher may present the animation program to the learner, as a reward.

After a few weeks of working together, the teacher should encourage the learner to study with the audio program all by himself or herself.

Many advantages may be realized using the methods and materials of the present invention:

(1) The system optimizes learning according to the age of the student by allowing the most frequently used (approximately two hundred) Chinese characters and other frequently used (approximately eight hundred) Chinese characters to be presented in multiple ways, each suitable for a specific age stage, according to the research-based human cognition developmental trajectory: birth to 2 years old, 2 to 4 years old, 4 to 7 years old, and 7 to 9 years old.

(2) The methods and materials allow a child to begin learning Chinese characters as early as birth, the optimum language-learning period, which reduces difficulty in mastering the pronunciation of Chinese at later age.

(3) The methods and materials allow a child to master about one thousand Chinese Characters independently as early as seven years old, which reduces educational costs and improves the learner's confidence and independence.

(4) The methods and materials allow teachers and young children to interactively study Chinese characters in a home environment.

(5) The methods and materials may combine a presentation of Chinese classical music, Chinese calligraphy, and native Chinese pronunciation to allow infants to appreciate the three most classical literacies in a synchronized and synesthesia environment.

(6) The methods and materials make learning attractive to a child by presenting about two hundred colorful sketch-like drawings, each representing one of the approximately two hundred most frequently used Chinese characters, each drawing indicating both the meaning and the look of the character, each drawing providing a colored sketch with only necessary details that are represented by strokes in the corresponding Chinese character.

(7) The methods and materials make learning attractive to a child and easy for a teacher to teach by presenting, in one embodiment, a digital video program consisting of about fifty story-telling animations on a white background, each accompanied by a matching Chinese melody, displaying about fifty Chinese characters. Each animation starts with an attractive multi-colored drawing on the white background indicating both the meaning and the look of the character, gradually turns into a character, and finally ends with the character presented in multi-color format, along with a human voice pronouncing the character and its translation in the user's native language (as chosen by the user before playing the video program). The color of each stroke of the character matches each part of the drawing. The digital video program may be suitable for viewing and listening by a child starting from birth. The animation program may be conveniently suitable for playback on commonly available DVD players.

(8) The methods and materials make learning attractive to a child by presenting a digital illusion in which a drawing indicating both the meaning and the look of the character gradually turns into a character.

(9) The text book materials make learning attractive to a child and easy for a teacher to teach by presenting each of the approximately two hundred characters with a multi-color drawing on a white background indicating both the meaning and the look of the character on the top of the page. In the middle of the page, the character may be presented in calligraphic, multi-colored format in the same size of the drawing. The color of each stroke of the character matches each part of the drawing, and below the calligraphic character, the character may be presented in black-color in a smaller font size, along with the explanation of the drawing in Chinese. At the bottom of the page, the pronunciation of the character may be presented in Pin Yin, along with and explanation of the drawing in the user's native language (as chosen by the user before buying the book). Tips to teach this character kinesthetically may be provided under each explanation. This book may be titled as suitable for reading by a child starting at two years old. An audio device presenting the pronunciation and meaning of all characters and the instructions of using the book in the user's native language may be provided along with the book.

(10) The coloring book material makes learning attractive to a child and easy for a teacher to teach by presenting each of the approximate two hundred characters with a smaller-sized drawing showing both the meaning and the look of the character on the top of the page. In the middle of the page, the character may be presented in a size double that of the drawing. All strokes of the printed character may be presented in white against a colorful background, which allows the child to color each stroke to match that of the drawing. The coloring book may be titled as suitable for practicing by a child starting at two years of age. All pages may be reproducible. An audio device presenting the pronunciation and meaning of all characters and the instructions of using the book in the user's native language may be provided along with the coloring book.

(11) The circling and lining book material makes learning attractive to a child and easy for a teacher to teach by presenting each of the approximately two hundred characters with a drawing showing both the meaning and the look of the character, along with the matching Chinese character. On the odd pages, within a rectangle frame, three drawings are presented on the left side with three matching characters on the right side, usually not in the same order. The user is instructed to use a line to connect the drawing with the matching character. The pronunciation and the meaning of the character are presented on the right side outside the frame to assist the user. On the even pages, each of the three drawings may be presented along with the three characters below it, within the frame. The child is instructed to circle the character matching the drawing. Outside the frame are the pronunciation and the meaning of the character matching the drawing. The circling and lining book may be titled as suitable for practicing by a child starting at two years of age. All pages may be reproducible. An audio device presenting the pronunciation and meaning of all characters and the instructions of using the book in the user's native language may be provided along with the book.

(12) The story book material makes learning attractive to a child and easy for a teacher to teach by presenting approximately fifty stories, consisting mostly of the approximately two hundred most commonly used Chinese characters and about one hundred new characters. Each story is made of about 4 to 10 sentences, and may be accompanied by several drawings in sequence. New characters, accompanied by their own Pin Yin, may be presented with learned characters in the sentence. The explanations of the new characters may be presented at the bottom of the page. An audio device in the user's native language may be provided with the story book. The story book may be titled as suitable for reading by a child starting at about four years old.

(13) The group book material makes learning attractive to a child and easy for a teacher to teach by presenting about seven hundred new characters, each based on or relevant to one or several of the approximately three hundred most commonly used characters. Characters with the same "meaning" or "sounding" element may be presented in groups, along with each one's own pronunciation and interpretation in the user's native language. An audio device in the child's native language may be provided with the book.

(14) The most frequently used one hundred Chinese characters are presented repeatedly in six formats, which imitates the natural linguistic developmental process even outside the Chinese language environment.

(15) Two reproducible books, the coloring book and the circling and lining book encourage the child to practice repeatedly.

(16) The methods and materials allow the learner to listen to the pronunciation of Chinese characters before actually seeing them, which imitates the natural linguistic developmental process even outside the Chinese language environment.

(17) The methods and materials allow the learner to study Chinese characters kinesthetically.

(18) The methods and materials allow the learner to study very complicated words mastered at young age, which allows young children to master about 10 classical Tang Poems as young as 4 years old.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for teaching Chinese to a child in progressive stages, each successive stage building on a previous stage, the method comprising:
   presenting a first stage material by an electric device animating a multi-colored drawing object and morphing the object into a multi-colored Chinese character representing the object;
   the multi-colored Chinese character having one or more colored strokes, each of the colored strokes of the Chinese character corresponding to parts of the object;
   the animation displaying the multi-colored object providing both meaning and appearance of the Chinese character being displayed, the animation gradually converting the multi-colored drawing object into the Chinese character being displayed;
   a second stage material displaying on a single page the object adjacent to the Chinese character, and allowing the child to associate the object with the Chinese character;
   a third stage material displaying a single page several characters comprising a story for the child to encounter basic characters in a multi-colored formation and associate the characters with each other;
   and a fourth stage material displaying a single page several characters sharing a common group element for the child to classify and analyze characters.

2. The method of claim 1 wherein the first and second stage materials each associate a plurality of colors to a plurality of strokes for one Chinese character.

3. The method of claim 2 wherein each Chinese character being displayed comprises one or more colored strokes, wherein the color of each stroke of the Chinese character being displayed corresponds to a part of a multi-colored drawing object.

4. The method of claim 1 wherein the first stage material comprises a digital video program.

5. The method of claim 1 wherein the second stage material includes, on the single page, instructions for teaching the character to the child.

6. The method of claim 1 wherein the second stage material comprises a circling and lining book.

7. The method of claim 1 wherein the second stage material comprises a coloring book.

8. The method of claim 1 wherein the first and second stage materials each associate a plurality of objects to a plurality of Chinese characters, each object uniquely associated to one of the Chinese characters.

9. The method of claim 8 wherein the plurality of Chinese characters comprises about 200 Chinese characters most frequently used by native speakers.

10. The method of claim 1 wherein the first stage material teaches the child between birth and about age 2, wherein the second stage material teaches the child between about age 2 and about age 4.

11. The method of claim 1 wherein the first, second, third and fourth stage materials each comprises separately executable programs in a common software module.

12. A video program residing on a non-transitory computer readable medium for teaching Chinese to a child in progressive stages, each successive stage building on a previous stage, the program comprising:
   presenting a first stage material animating a multi-colored drawing object and morphing the object into a multi-colored Chinese character representing the object;
   the multi-colored Chinese character having one or more colored strokes, each of the colored strokes of the Chinese character corresponding to parts of the object;
   and the animation displaying the multi-colored object providing both meaning and appearance of the Chinese character being displayed, the animation gradually converting the multi-colored drawing object into the Chinese character being displayed.

13. The video program of claim 12 wherein each animation is accompanied by an audible melody.

14. The video program of claim 12 wherein each animation is accompanied by an audible voice pronouncing the Chinese character in Chinese.

15. The video program of claim 12 wherein each animation is accompanied by an audible translation of the Chinese character in a preselected non-Chinese language.

16. The video program of claim 12 wherein the color of each stroke of the Chinese character being displayed corresponds to a part of the multi-colored drawing object.

17. The method of claim 1 wherein the second stage material comprising:
   a text book for teaching basic Chinese characters to a child,
   a plurality of pages, each page displaying one object drawing;
   one basic Chinese character associated with the object drawing;
   a first block of text written in Chinese including an explanation of the basic Chinese Character;
   and a second block of text including a Pin Yin for pronouncing the basic Chinese character.

18. The method of claim 1 wherein the second stage material comprising:
   a group book for teaching basic Chinese characters to a child,
   a plurality of pages, each page displaying a group element as a heading for the page;
   a plurality of rows below the heading, each row displaying the group element, a basic Chinese character adjacent to the group element, and a new character representing a combination of the group element and the basic Chinese character adjacent to the group element.

19. The method of claim 18 wherein the group element is selected from a group comprising a particular meaning and a particular sound.

* * * * *